United States Patent [19]

Leupold et al.

[11] 3,890,366

[45] June 17, 1975

[54] α-PHENYL-β,β-PENTAMETHYLENE-GLUTARIC ACID DINITRILES AND PROCESS FOR THEIR PREPARATION

[75] Inventors: Ernst Ingo Leupold, Hofheim, Taunus; Hans-Jürgen Arpe, Fischbach, Taunus,, Germany

[73] Assignee: Hoechst Aktiengesellschaft, Frankfurt am Main, Germany

[22] Filed: Apr. 23, 1973

[21] Appl. No.: 353,319

Related U.S. Application Data

[63] Continuation-in-part of Ser. No. 331,510, Feb. 12, 1973, abandoned.

[30] Foreign Application Priority Data

Feb. 15, 1972 Germany.............................. 2207020

[52] U.S. Cl...... 260/465 F; 260/465 G; 260/465 H; 260/515 A; 260/515 R; 260/520; 260/558 R; 260/559 R; 260/570.5 P; 260/999

[51] Int. Cl............................................ C07c 121/64
[58] Field of Search......... 260/465 H, 465 G, 465 F

[56] References Cited

UNITED STATES PATENTS 3,085,930   4/1963   Braunholtz et al............ 260/465 X

OTHER PUBLICATIONS

Isubamoto et al., Chemical Abstracts, Vol. 57, p. 7117 (1962).

Primary Examiner—Elbert L. Roberts
Assistant Examiner—Dolph H. Torrence
Attorney, Agent, or Firm—Curtis, Morris & Safford

[57] ABSTRACT

α-phenyl-β,β-pentamethylene-glutaric acid dinitriles and their preparation from cyclohexylidene acetonitrile and benzylcyanides in the presence of basic catalysts in the liquid phase.

9 Claims, No Drawings

α-PHENYL-β,β-PENTAMETHYLENE-GLUTARIC ACID DINITRILES AND PROCESS FOR THEIR PREPARATION

This is a continuation-in-part of application Ser. No. 331,510 filed Feb. 12, 1973, now abandoned.

The present invention relates to α-phenyl-β,β-pentamethylene-glutaric acid dinitrile and to derivates thereof. These compounds have the formula:

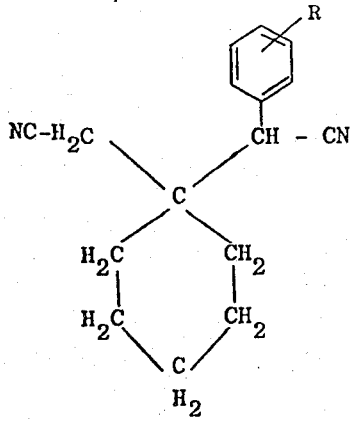

in which R signifies hydrogen, lower alkyl of up to 4 carbon atoms, alkoxy of up to 4 carbon atoms, and halogen.

Furthermore, the invention relates to a process for the preparation of α-phenyl-β,β-pentamethylene-glutaric acid dinitriles wherein cyclohexylidene-acetonitrile is reacted, in the presence of a basic catalyst in the liquid phase, with a benzyl cyanide of the formula:

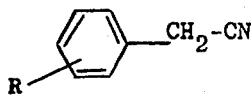

in which R has the above meaning. In this reaction the cyanomethylene group of the benzyl cyanide is added according to the Michael's reaction to the double bond of the cyclohexylidene-acetonitrile.

The reaction begins with the addition of the catalyst to the liquid mixture of the reaction components. However, the reaction proceeds satisfactorily also in inert solvents as commonly used, for example benzene, hexane.

Cyclohexylidene-acetonitrile, which can be obtained from acetonitrile and cyclohexanone in a good yield, is reacted expediently with the respective benzyl cyanide in a molar ratio of 1:1. The reaction takes place however even with a large excess of one of the two components.

If a monosubstituted benzyl cyanide is used, the substituent can be arranged in ortho-, meta- or para-position to the cyanomethylene-group. Each with higher substituted benzyl cyanides or benzyl cyanides partly hydrogenated in the phenyl nucleus the reaction proceeds still satisfactorily.

On principle all basic catalysts are suitable for the process of the invention. The alkali and alkaline earth metal as well as their amides, hydrides and alcoholates are used preferably; also mixtures of these compounds catalyze the reaction of the invention.

The quantity of catalyst is expediently 0.1 to 10 mole % calculated on cyclohexylidene-acetonitrile; but even outside these limits satisfactory yields are still obtained.

The reaction of the invention is generally carried out at a temperature of from 0° to 200°C, preferably from 20° to 80°C.

The process of the invention can be carried out in all apparatus suitable for a reaction in the liquid phase.

The working up of the reaction mixture takes place according to the known methods: for example the reaction product is obtained generally in crystalline form after distilling off of excess or non-reacted reactants or of possible solvents used and can be further purified. For example a recrystallization from methanol or acetonitrilemethanol mixtures has proved suitable.

The α-phenyl-β,β-pentamethylene-glutaric acid dinitriles of the invention belong to a technically interesting class of compounds with valuable properties as intermediate products, since both nitrile groups permit a large number of reactions, for example hydrogenation to amines, saponification to amides or acids and ring closure reactions. For example, the diamines obtainable by hydrogenation are useful as co-monomers in the manufacture of transparent polyamides. Furthermore, the presence of a quaternary carbon atom in the α-phenyl-β,β-pentamethylene glutaric acid dinitriles is of importance for use in the medical field, e.g., in the preparation of intermediate products used in the production of narcotics.

The following examples illustrate the invention.

EXAMPLES 1-7

A mixture of 0.1 mole of cyclohexylidene acetonitrile, 0.1 mole of a benzyl cyanide (see table) and 0.001 mole of K-tertiary-butylate was heated in a beaker for 12 hours at 50°C. After cooling the solidified melt was recrystallized from methanol, which may contain up to 10 % of acetonitrile according to solubility and dried in the high vacuum. The yields and melting points of the α-phenyl-β,β-pentamethylene-glutaric acid dinitriles obtained are seen from the table. In the column R the substituent at the phenyl radical is indicated.

| Example | R | Yield (%) | Melting (°C) point |
|---|---|---|---|
| 1 | H— | 92 | 106° |
| 2 | 4—CH₃— | 64 | 87° |
| 3 | 4—CH₃O— | 76 | 99° |
| 4 | 2—Cl— | 53 | Oil |
| 5 | 4—Cl— | 88 | 157° |
| 6 | 3—Br— | 82 | 88° |
| 7 | 4—Br— | 90 | 156° |

EXAMPLE 8

A mixture of 0.1 mole of cyclohexylidene acetonitrile, 0.1 mole of benzyl cyanide and 0.005 mole of NaH was reacted, as described in Example 1, and worked up. The yield of α-phenyl-β,β-pentamethylene-glutaric acid dinitrile was 89 %.

EXAMPLE 9

A mixture of 0.1 mole of cyclohexylidene-acetonitrile, 0.1 mole of 4-methoxybenzyl cyanide and 0.003 mole of sodium was reacted as in Example 1 at 70°C and worked up. α-(4-methoxyphenyl)-β,β-pentamethylene glutaric acid dinitrile was obtained in a yield of 90 %.

EXAMPLE 10

0.5 Mole of cyclohexylidene-acetonitrile, 0.5 mole of 4-methylbenzyl-cyanide and 0.004 mole of NaNH$_2$ were reacted as in Example 1 and worked up. The yield of α-(4-methylphenyl)-β,β-pentamethylene glutaric acid dinitrile was 59 %.

What is claimed is:

1. A compound of the formula

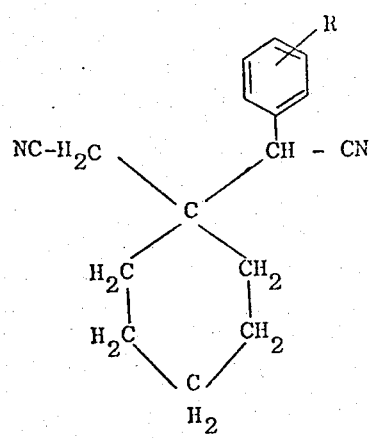

in which R is hydrogen, lower alkyl of up to 4 carbon atoms, alkoxy of up to 4 carbon atoms, or halogen.

2. The compounds of claim 1 wherein R is hydrogen.
3. The compounds of claim 1 wherein R is methyl.
4. The compounds of claim 1 wherein R is methoxy.
5. The compounds of claim 1 wherein R is chlorine.
6. The compounds of claim 1 wherein R is bromine.
7. Process for the preparation of α-phenyl-β,β-pentamethylene-glutaric acid dinitriles as defined in claim 1, which comprises reacting cyclohexylidene-acetonitrile, in the presence of a basic catalyst selected from the group consisting of alkali and alkaline earth metals, the amides thereof, the hydrides thereof, and alcoholates thereof and mixtures of same and in the liquid phase, with a benzyl cyanide of the formula

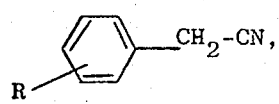

in which R has the meaning specified in claim 1.

8. Process as defined in claim 7, wherein the reaction temperature is of from 0° to 200°C.
9. Process as defined in claim 8, wherein the reaction temperature is of from 20° to 80°C.

* * * * *